US009838969B2

(12) United States Patent
Vance et al.

(10) Patent No.: US 9,838,969 B2
(45) Date of Patent: Dec. 5, 2017

(54) METHOD, DEVICE AND SYSTEM FOR SETTING OPERATION MODES OF COMMUNICATION DEVICES IN A COMMUNICATION NETWORK

(71) Applicant: Sony Corporation, Tokyo (JP)

(72) Inventors: Scott Vance, Staffanstorp (SE); Patrik Lundell, Svedala (SE); Par Hakansson, Malmo (SE)

(73) Assignee: Sony Mobile Communications Inc., Tokyo (JP)

( * ) Notice: Subject to any disclaimer, the term of this patent is extended or adjusted under 35 U.S.C. 154(b) by 97 days.

(21) Appl. No.: 14/571,722

(22) Filed: Dec. 16, 2014

(65) Prior Publication Data

US 2016/0174158 A1   Jun. 16, 2016

(51) Int. Cl.
  *H04W 52/02* (2009.01)
  *H04W 8/22* (2009.01)
  *H04W 4/08* (2009.01)

(52) U.S. Cl.
  CPC ......... *H04W 52/0251* (2013.01); *H04W 4/08* (2013.01); *H04W 8/22* (2013.01); *H04W 52/0219* (2013.01); *Y02B 60/50* (2013.01)

(58) Field of Classification Search
  CPC ..... H04W 8/22; H04W 52/0251; H04W 4/08; H04M 1/72527
  USPC ................. 455/418–420, 518, 41.2; 370/338
  See application file for complete search history.

(56) References Cited

U.S. PATENT DOCUMENTS

| | | | |
|---|---|---|---|
| 2005/0261037 A1 | 11/2005 | Raghunath et al. | |
| 2007/0183807 A1* | 8/2007 | Park | G06F 1/3215 399/88 |
| 2009/0207093 A1* | 8/2009 | Anreddy | H04B 7/04 343/876 |
| 2012/0244885 A1* | 9/2012 | Hefetz | G06Q 20/32 455/456.2 |
| 2013/0109371 A1* | 5/2013 | Brogan | G06F 1/1626 455/420 |
| 2014/0173082 A1* | 6/2014 | Shin | H04L 41/24 709/223 |

(Continued)

FOREIGN PATENT DOCUMENTS

| | | |
|---|---|---|
| EP | 2 341 702 A1 | 7/2011 |
| WO | WO 2014/182377 A2 | 11/2014 |
| WO | WO 2014182377 A2 * | 11/2014 ........ H04W 52/0251 |

*Primary Examiner* — Kamran Afshar
*Assistant Examiner* — Farideh Madani
(74) *Attorney, Agent, or Firm* — Renner, Otto, Boiselle & Sklar, LLP; Grant Steyer

(57) ABSTRACT

A method for setting operation modes of a group of communication devices in a communication network, wherein the group of communication devices comprises a first communication device and at least a second communication device, the method comprises receiving information from at least one device of said group of communication devices, determining an operation mode based on the received information and setting an operation mode on at least one of the other communication devices of the group of communication devices to the determined operation mode, wherein information is communicated between the two devices including state information and/or instructions to set the operation mode of at least one of the other communication device of the group of communication devices to the determined operation mode.

18 Claims, 8 Drawing Sheets

(56) References Cited

U.S. PATENT DOCUMENTS

2014/0273858 A1* 9/2014 Panther ............... A61B 5/0002
455/41.2
2015/0026229 A1* 1/2015 Chung ................... H04L 67/02
709/201

* cited by examiner

METHOD, DEVICE AND SYSTEM FOR SETTING OPERATION MODES OF COMMUNICATION DEVICES IN A COMMUNICATION NETWORK

TECHNICAL FIELD

The present invention relates in general to setting operation modes of connected communication devices in a communication network.

BACKGROUND ART

Today the use of multiple connected communication devices is commonplace. A user may have e.g. mobile phone, a smart watch or wrist band, as well as a wireless audio device such as a headset. Each of these devices contains separate batteries and must generally be charged separately.

Currently the devices collect a significant amount of information. This may include detailed information such as how the device and subsequently the user are moving as well as where they are located. This may be either in terms of raw data such as vibrations, orientation, etc. or processed data, i.e. that the user, carrying the device, is riding a bicycle, walking, jogging, etc.

Today the information from a single device may be used to put the device into standby mode or power saving mode. An example of this is that when a user wears a watch in a certain position, the screen may turn off. Similarly, when a user holds the mobile phone next to his/her head during a call, the backlighting is turned off using proximity and/or touch sensors. It is also possible to set a timer for waking up devices which are put in some kind of power saving mode.

The negative effects of using multiple connected electronic devices is that when one of the devices are in power saving mode the other may still be in active mode and using the battery power.

There is a need to maximize battery life of the electronic communication device.

SUMMARY OF THE INVENTION

With the above description in mind, then, an aspect of some embodiments of the present invention is to provide a method, device and system for controlling operation modes of a group of communication devices in a communication network, which seeks to mitigate, alleviate or eliminate one or more of the above-identified deficiencies in the art and disadvantages singly or in any combination.

An aspect of the present invention relates to a method, performed in a first communication device for setting operation modes of at least a second communication device of a group of connected communication devices in a communication network. The group of communication devices comprises the first communication device and at least the second communication device. The method comprises receiving information representing environmental data from at least one of the communication devices of the group of communication devices and determining an operation mode based on said received information and setting the operation mode of at least the second communication device of the group of communication devices to the determined operation mode.

Another aspect of the present invention relates to a method, performed in a second communication device, for setting operation modes of at least the second communication device of a group of connected communication devices in a communication network. The group of communication devices comprises a first communication device and at least said second communication device. The method comprises receiving data from the first communication device, determining an operation mode based on the received data and setting the operation mode of the second communication device to the determined operation mode.

Another aspect of the present invention relates to a first communication device configured for setting an operation mode of at least a second communication device of a group of connected communication devices in a communication network. The group of communication devices comprises the first communication device and at least the second communication device. The first communication device comprises a processing circuitry configured to receive information representing environmental data from at least one communication device of the group of communication devices, determine an operation mode based on the received information and set the operation mode of the at least second communication device of the group of communication devices to the determined operation mode.

Another aspect of the present invention relates to a system for setting an operation mode of at least one communication device of a group of connected communication devices in a communication network. The group of communication devices comprises a first communication device and at least a second communication device. The first communication device comprises a processing circuitry configured to receive information representing environmental data from at least one communication device of the group of communication devices, determine an operation mode based on the received information and set the operation mode of at least the second communication device of the group of communication devices, to the determined operation mode. The second communication device comprises a processing circuitry configured to receive data from the first communication device, determine an operation mode based on the received data and set an operation mode of the second communication device to the determined operation mode.

The features of the above-mentioned embodiments can be combined in any combinations.

Some embodiments of the invention provide a method for using information from a first communication device to set the operation mode of a second communication device into standby mode. It is an advantage with some embodiments of the invention that they may allow for using information from the second communication device to compliment information from the first communication device in determining the operation mode and/or duration for the operation mode in the first and/or the second communication device. It is an advantage with some embodiment in that the received information can be used to set various devices into stand-by or other low-power modes from which they can be awoken at strategic times, activities, or when activity is likely to occur again.

BRIEF DESCRIPTION OF THE DRAWINGS

Further objects, features and advantages of the present invention will appear from the following detailed description of the invention, wherein embodiments of the invention will be described in more detail with reference to the accompanying drawings, in which.

DETAILED DESCRIPTION

Figure 1:
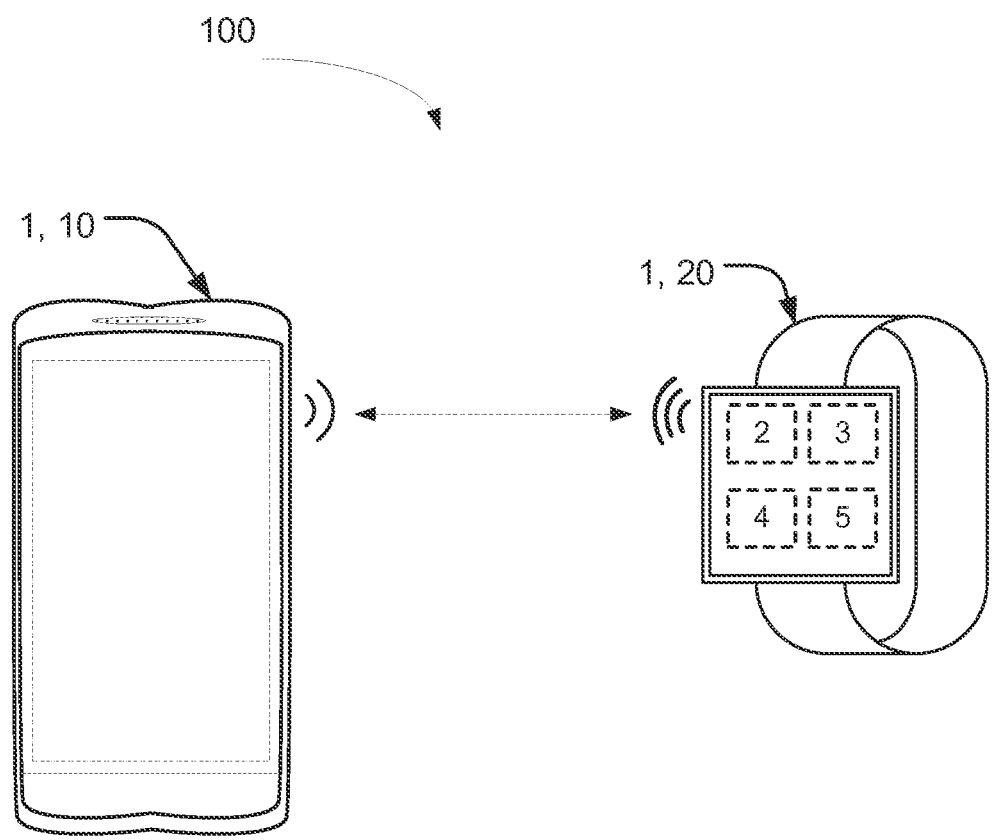
FIG. 1 illustrates a system of electronic devices according to the invention.

Aspects of the present disclosure will be described more fully hereinafter with reference to the accompanying drawings. The method, device and system disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

As used herein, the term "communication device" includes portable communication devices, portable radio communication devices, servers, gaming consoles and wearables. A portable communication device or a portable radio communication device may be referred to below as a smartphone and includes all electronic equipment, including, but not limited to, capable of using voice and/or data communication. As will be appreciated, the disclosure may be used with mobile phones, other phones, smartphones, personal digital assistants (PDAs), computers, other communication devices, laptops, tablets, wearables, servers, gaming consoles, etc.

Significant amounts of information are currently collected by communication devices, as stated before. Information may be collected from accelerometers and other devices to determine both the location of the device and the user and their state of motion. This may include detailed information such as how they are moving, e.g. walking, cycling, riding a bus, etc., as well as where they are located, e.g. an office, at home, etc. Previously the information from a single device has been used to put it into standby mode. An example of this is that when one wears a watch in a certain position, the screen may turn off. Similarly, when one holds the phone next to your head during a call, the backlighting is turned off using proximity and/or touch sensors.

In order to maximize battery life, it may be advantageous to use information from one or more devices to control the other devices and set them in an operation mode, e.g. a low-power or stand-by mode.

We propose using information from a second device to put a first device into a lower power state and, in some cases, to wake up the device from this state. In some embodiments, information from the first device can complement information from the second device in determining which operation mode is appropriate and/or the duration for the operation mode in the first device.

It is proposed that the information collected be used to set various devices into an operation mode, e.g. a stand-by or other low-power modes from which they can be awoken at strategic times when activity is likely to occur again.

The present disclosure proposes a method for setting operation modes of connected electronic communication devices 1, 10, 20, 30 wherein the method is configured to be performed in a communication device 1, 10, 20, 30 wherein the communication device 1, 10, 20, 30 comprises communication circuitry 2 and processing circuitry 3. Furthermore, communication devices 1, 10, 20, 30 are provided which performs the method.

Figure 2:
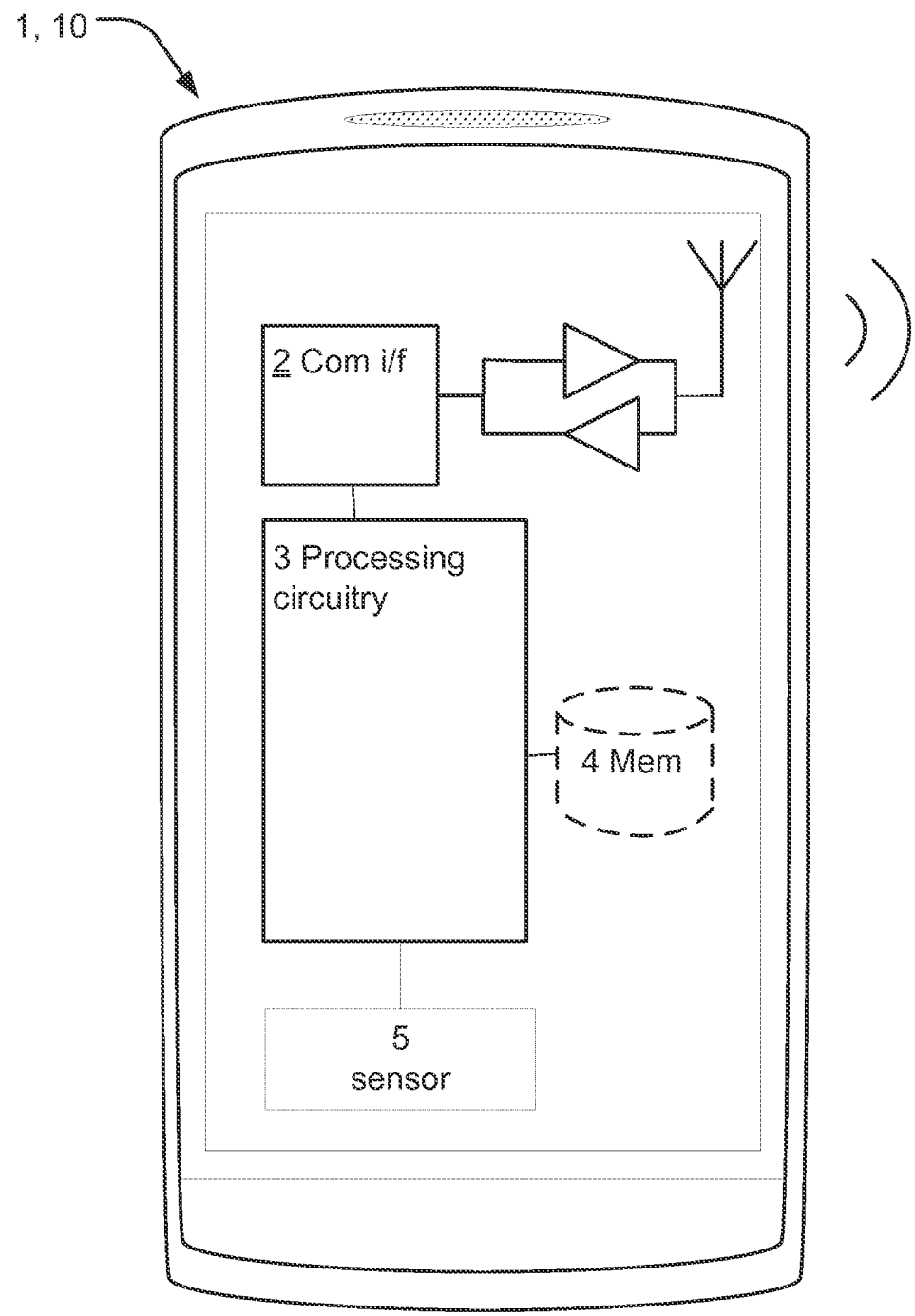
FIG. 2 illustrates a first or a second communication device according to the invention.
Figure 3A:
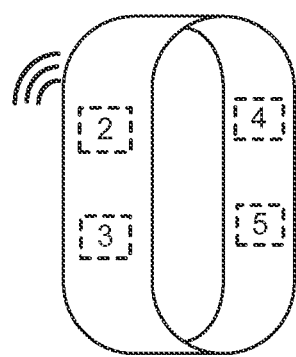
FIG. 3A-3D illustrates a first or a second communication device according to the invention.
Figure 3B:
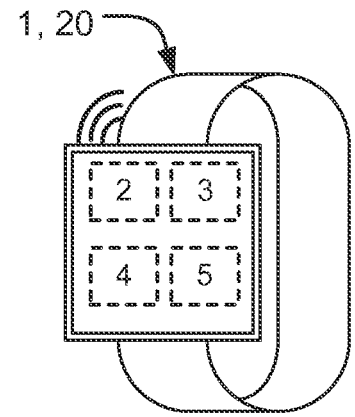
Figure 3C:
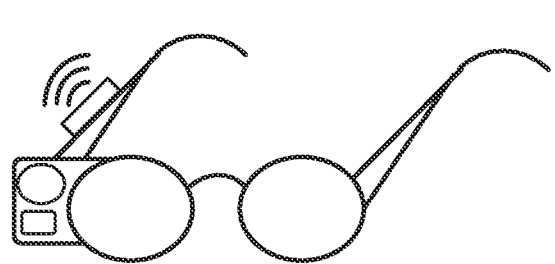
Figure 3D:
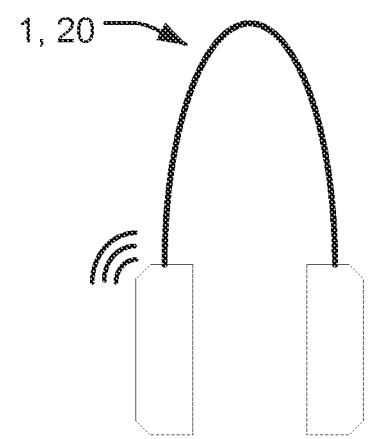
Figure 4:
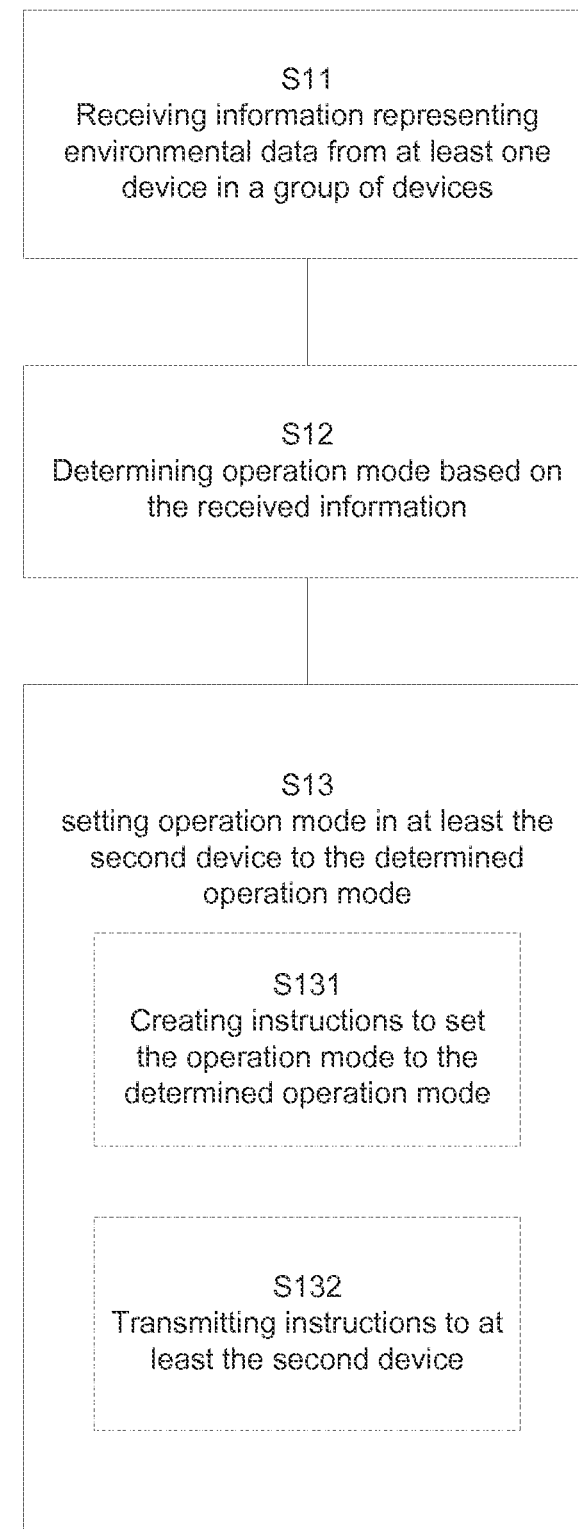
FIG. 4-8 comprises flowcharts illustrating the proposed method.
Figure 5:
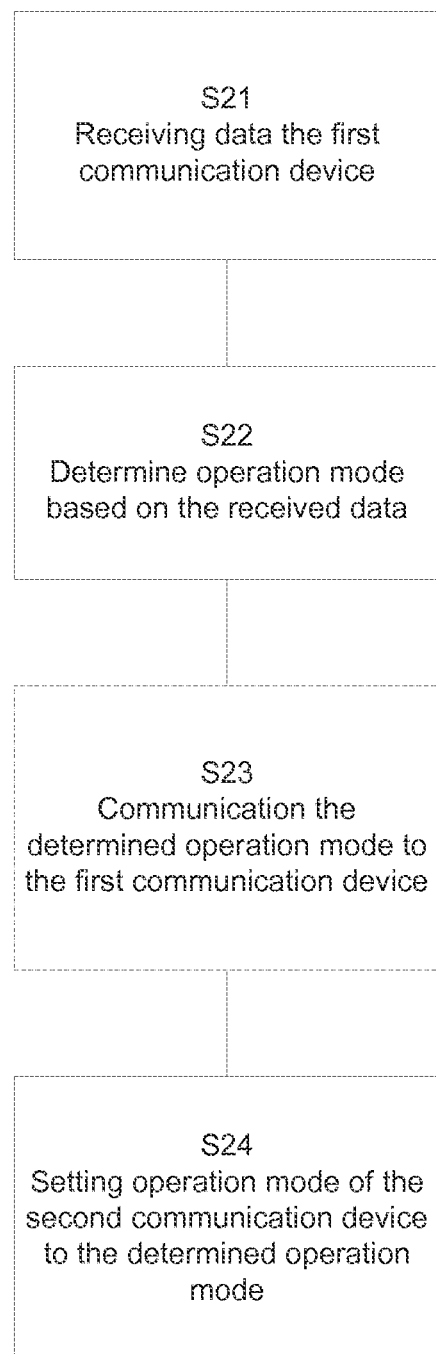

FIGS. 1 to 3D illustrates examples of communication devices 1, 10, 20, 30. In FIGS. 1 and 2 the first communication device 1 is illustrated as a mobile communication device 10, such as a smartphone. In FIGS. 1 and 3A the second communication device 1 is illustrated as a wearable device 20, such as a wrist band. In FIG. 3B the communication device is illustrated as a wearable device, such as a watch. In FIG. 3C the electronic device is illustrated as a pair of wearable glasses and in FIG. 3D the electronic device is illustrated as a headset.

The first communication device 1, 10, 20, 30 is configured for setting an operation mode of at least a second communication device 1, 10, 20, 30 of a group 100, 110, 120 of connected communication devices in a communication network. The group of communication devices comprises first communication device e.g. a mobile phone, and at least a second communication device e.g. a wrist band. It is understood that while the first communication device is shown as a phone and the second communication device as a wrist band, one could just as easily use the second communication device to set the operational modes of the first communication device. In other words, the devices are interchangeable for the purposes of this invention.

The first communication device comprises a processing circuitry 3, as shown in FIG. 2. The processing circuitry 3 is configured to receive information representing environmental data from at least one communication device of the group of communication devices, to determine an operation mode based on the received information and to set the operation mode of the at least second communication device of the group of communication devices to the determined operation mode. In one aspect, the processing circuitry is configured to determine an operation mode specified for each of the communication devices of the group of the communication devices. In one aspect the received information comprises information of one or more of position, state of motion, orientation, temperature, atmospheric pressure, or availability of wireless network of the at least one communication device of said group of communication devices. In one aspect the received information comprises an element associated with any of time of day, day of week or date.

In one embodiment the processing circuitry 3 is configured to create instructions to set the operation mode to the determined operation mode and to transmit the instructions to at least the second communication device. In one aspect the instructions comprises the duration in time of the determined operation mode.

In one embodiment the determined operation mode comprises the priority for an action which can be accomplished by more than one of the communication devices of the group of communication devices.

In one embodiment, the decided operation mode is one of a low-power mode and standby mode.

A system for setting an operation mode of at least one communication devices 1, 10, 20, 30 of a group 100, 110, 120 of connected communication devices in a communication network is provided. The group of communication devices comprises a first communication device 1, 10, 20, 30 and at least a second communication device 1, 10, 20, 30. The first communication device comprises a processing circuitry 3 configured to receive information representing environmental data from at least one communication device of the group of communication devices, to determine an operation mode based on the received information and to set an operation mode of at least the second communication device of the group of communication devices to the determined operation mode. The at least second communication device comprises a processing circuitry 3 configured to receive data from the first communication device to determine an operation mode based on the received data and to set the operation mode of at least the second communication device to the determined operation mode.

The operation mode may be a power saving mode with different levels of power savings, such as stand-by mode, low power saving mode, night mode etc. The operation mode may also be preset such as different modes during sleeping, working, travelling, training, relaxing etc.

FIG. 4-8 is flow diagrams depicting example operations which may be taken by the electronic devices of FIGS. 1 to 3D. It should be appreciated that the operations need not be performed in the order shown in the figure. Furthermore, it should be appreciated that not all of the operations need to be performed.

The method, performed in a first communication device 1, 10, 20, 30 for setting operation modes of at least a second communication devices 1, 10, 20, 30 of a group 100, 110, 120 of connected communication devices in a communication network. The group of communication devices comprises the first communication device 1, 10, 20, 30 and at least the second communication device 1, 10, 20, 30. There could be more than two communication devices in the group of communication devices.

The communication network may be any wireless communication network, including but not limited to Blue Tooth® (BT), Wireless Local Area Network (WLAN), Body Area network (BAN), wireless body area network (WBAN), Wide Area Network (WAN), cellular networks, cellular connectivity, optical communication network, ultrasonic communication network, etc.

The method comprises the first step of receiving S11 information representing environmental data from at least one of the communication devices of the group of communication devices. The processing circuitry 3, of the first communication device, as shown in FIG. 2 is configured to receive the information representing environmental data from a sensor 5 of at least one communication device of the group of communication devices. In one aspect the processing circuitry is configured to receive information collected by a sensor within the same communication device.

The method comprises a second step of determining S12 an operation mode based on the received information. The processing circuitry 3, of the first communication device, is configured to determine an operation mode based on the received information. In one aspect the step of determining an operation mode comprises determining operation mode specified for at least one of the communication devices of the group of communication devices. In one aspect the determined operation mode comprises the priority for an action which can be accomplished by more than one of the communication devices of the group of communication devices. In one aspect the received information comprises information of one or more of position, state of motion, orientation, temperature, atmospheric pressure, or availability of wireless network of the at least one communication device of said group of communication devices. In one aspect, the received information comprises an element associated with any of time of day, day of week or date.

The method comprises a third step of setting S13 the operation mode of at least the second communication device 1, 20 of the group of communication devices, the determined operation mode. The processing circuitry 3, of the first communication device, is configured to set the operation mode of the at least second communication device to the determined operation mode. In one aspect the step of setting the operation mode comprises creating instructions 5131 to set the operation mode to the determined operation mode and transmitting 5132 the created instructions to at least the second communication device of the group of communication devices. In one aspect the created instructions comprises the duration in time of the determined operation mode.

In one embodiment the determined operation mode is one of a low-power mode and standby mode.

A method, performed in a second communication device 1, 10, 20, 30 for setting operation modes of at least said second communication devices 1, 10, 20, 30 of a group 100, 110, 120 of connected communication devices in a communication network. The group of communication devices comprises a first communication device and at least the second communication device.

The method comprises a first step of receiving S21 data from the first communication device. The processing circuitry 3, of the second communication device, as shown in FIG. 3A-3D is configured to receive the information representing environmental data from at least one communication device of the group of communication devices. In one aspect the received data comprises information of a status of the first communication device. In one aspect the received data comprises instructions to set operation mode of the second communication device to a predetermined operation mode. In one aspect the received data includes environmental data including one or more of position, state of motion and/or orientation, audio data collected from the environment, temperature, atmospheric pressure, or availability of wireless networks.

The method comprises a second step of determining S22 an operation mode based on the received data.

The method comprises a third step of communicating S23 an intended operation mode of the second communication device to the first communication device prior to setting S24 the determined operation mode.

The method comprises a fourth step of setting S24 the operation mode of the second communication device to the determined operation mode. In one aspect the setting of the operation mode is automatically performed by the processing circuitry of the second device. In one aspect the setting of the operation mode is manually performed by the user of the second device.

The information is being collected using at least one sensor device 5 comprised in the communication device. The processing circuitry 3 is configured to receive the information using the communication circuitry 2 from at least one of the communication devices within the group of communication devices. In other words, the first communication device receives the information collected by at least one sensor device 5 of either a second communication device or the first communication device. The word sensor is meant in this context to include both traditional sensors of acceleration, temperature, light, sound, orientation, etc., in addition to network and other information such as time or proximity to a wireless transmitter which allows the device to determine the likely location of use or user intent. According to some aspects the processing circuit 3 comprises a receiver for receiving the information. The user is a user of the electronic device which comprises the at least one sensor which collects information with respect to one or more of the following: time, location, orientation, and state of motion. Note that the method which is being described here does not need to be performed on the same communication device as the communication device which collects and/or receives the information. Examples of this will be given below.

Figure 6:
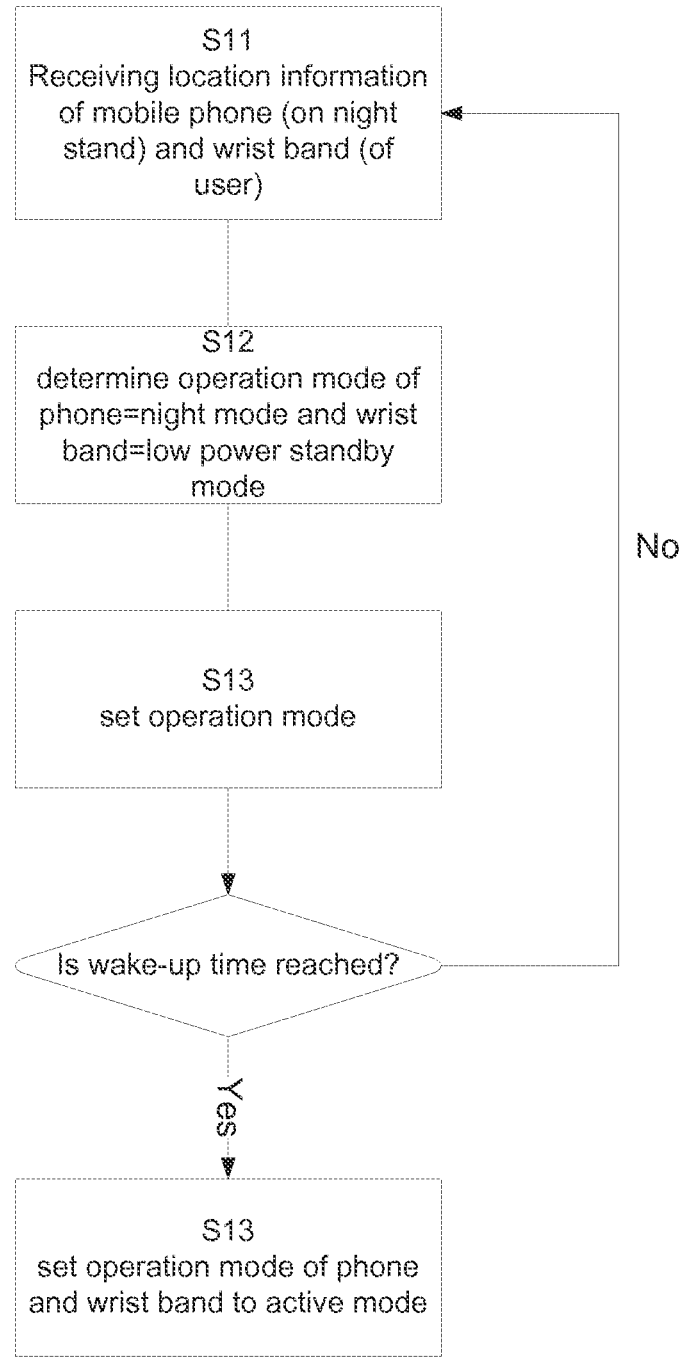

In one example, as shown in FIG. 6, the first communication, e.g. a mobile phone 1, 10, and the second communication device, e.g. a wrist band 1, 20 are both placed on a night stand, a known location based on the WiFi positioning, time of day, Global Positioning System (GPS) positioning, or other information. The mobile phone 1, 10 receives information S11 which includes for example the time of day and location and determines S12 operation mode for the first communication device, mobile phone, to be night mode. The mobile phone sets the operation mode of itself to night mode, which may or may not include signalling, but data transfer is deactivated and silent mode is activated so there will be no alerts for incoming e-mails, messages, etc. Further the mobile phone determines operation mode for the second communication device, the wristband 1, 20, to be low-power standby mode if one determines that the user is not wearing the wrist band. Instructions are sent by the mobile phone to the wristband to set S13 the operation mode of the wrist band to low-power standby mode. The instructions may further comprise time and duration information, e.g. wake-up for both devices could be set based on usage patterns to a typical waking time, such as 6 am. Alternatively or in addition, if the user had an alarm set for a certain time, both devices could go into a sleep mode until it was time for this alarm to go off.

Figure 7:
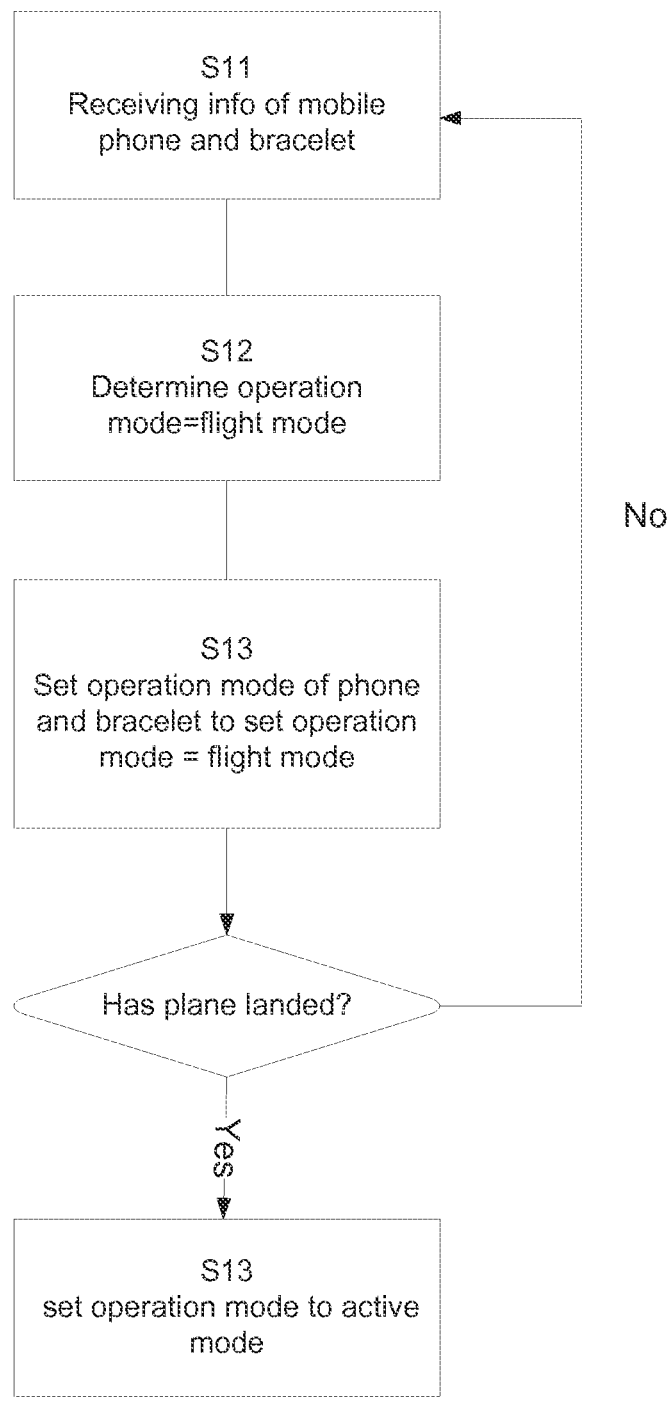

In one embodiment, as shown in FIG. 7, the user wearing a first communication device, e.g. a mobile phone 1, 10 and second communication device 1, 20, e.g. a bracelet, is on an airplane.

The mobile phone receives information S11 comprising position information which has been determined based on the WiFi, wherein there is no coverage except on WiFi and the last WiFi connections available has been in an airport. Thus the operation mode is determined S12 to be flight mode. One could further determine that the user was on an airplane by analysis of the ambient noise and/or the vibration profile, state of motion, experienced by the communication device, thus the received information may comprise information of vibration status, state of motion, background noise and/or location. In some applications, information from other applications including the calendar or e-mail applications could be used to determine that the user was on a flight. In any case, the mobile phone could turn off the radios, set S13 the mode to flight mode, as well as other devices if it was determine based on the time of the flight that the user was likely to be sleeping. If flight information was not available from other applications, the wrist worn device could check the vibration status, state of motion, and/or background noise in order to determine when the flight had landed, for example, the wrist worn device could check the status every 20 minutes. The wrist worn device could notify the mobile phone, when the flight lands, to activate the radio again using the radio protocol which was still active on the phone, such as BT low-energy. This could save considerable power in the mobile phone if the user had otherwise forgotten to place the mobile phone in flight mode. Alternatively, the mobile phone can wake up at regular intervals, e.g. each 20 minutes and check with the wrist worn device to see if they are still on the plane using BT low-energy.

In one embodiment, if the user is home and it is night, the time being determined either by a clock in one or more devices or network data, the first communication device 1, 10, e.g. a mobile phone could set an operation mode of a wireless headset 1, 20, the second communication device, used for music listening, to a stand-by or off mode until the next day when it was likely to be used again. Alternatively, the mobile phone could turn off the headset until it was either paired again, via Near Field Communication (NFC) if it was known that this was the primary paring mode used by the user and it was only connected to a single device i.e. the phone or in some aspects until the headset was lifted indicating the user intended to start using it.

In one embodiment, the user has a cellular enabled watch 1, 10, first communication device, and mobile phone 1, 20, second communication device, the range between the two communication devices is detected by using the BT and/or WLAN connection between the two communication devices. When the range became significant and the phone was still within the home WiFi network range, it is determined that the user wearing the watch had left the home position and that the mobile phone is still at home, thus the received position information S11 of the mobile phone 1, 20 is determined to be at the home position. The watch then sends instructions S13 to the mobile phone using the WAN (example cellular network) to set the operation mode of the mobile phone to a determined S12 operation mode such as low-power state mode or off mode, thus turning off the primary functions of the mobile phone, leaving only the BT low-energy active. All phone calls would be routed to the watch until the mobile phone is awakened. The mobile phone could be awakened either by sending a signal, with instructions to set a new operation mode of the mobile phone, from the watch when it comes within range of the mobile phone or by using an accelerometer in the mobile phone, i.e. the phone becomes active when it is picked up, the received information comprises information of state of motion of the mobile phone. Alternatively, if the mobile phone was in motion and the watch was not moving, the operation mode of the mobile phone is set to active mode and the operation mode of the watch is set to a stand-by mode.

Figure 8:
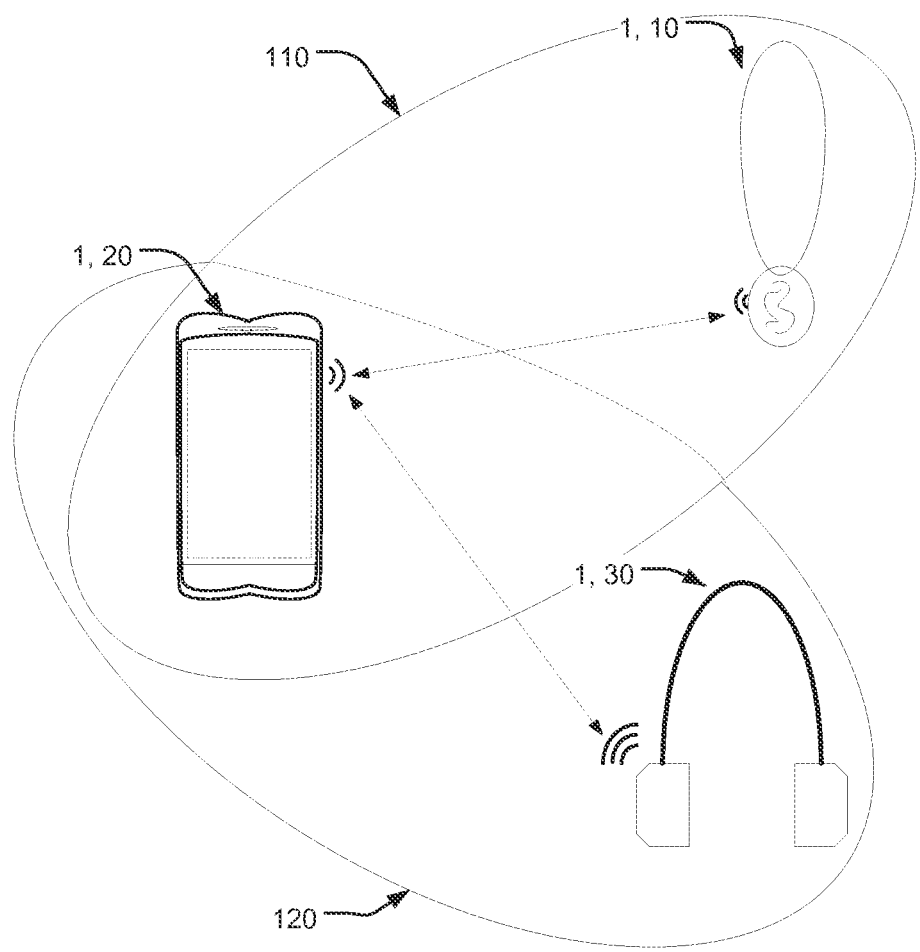

In one embodiment, as shown in FIG. 8, the user is wearing a communication device 1 in the shape of a bracelet, the first communication device 1, 10 of the first group of devices 110. The user also has a mobile phone 1, 20, the second device of the first group of devices 110. The first group of devices comprises the bracelet 1, 10 and the mobile phone 1, 20. The user also wears a wireless headset 1, 30, the second device of a second group of devices 120, which also comprises the mobile phone 1, 20, which is the first device of the second group of devices 120, and the headset 1, 30. The user goes to bed at night and falls asleep. The bracelet 1, 10 detect that the user is sleeping, receives the information S11, determines an operation mode S12, which is low power mode, and sets its own operation mode to low power mode and sets the operation mode of mobile phone to sleep mode. The mobile phone receives the information S21 and determines the operation mode of it self to sleep mode. Since the mobile phone is the first communication device of the second group 120 the mobile phone determines the operation mode of the wireless headset 20 to low power mode and after that, the mobile phone sets the operation mode of itself into sleep mode. As the user wakes up in the morning, the bracelet detects this, receives information of wake up activity, determines operation mode to wake up mode and sets the operation mode of the mobile phone to active mode.

In one embodiment, the received information comprises information regarding the wake-up mechanism and/or duration of the sleep mode.

In one embodiment, the awakening is performed through the use of timers. When the first communication device is set into a low-power mode, a timer is set by the processing circuitry of the first communication device. In one aspect, this timer is set with an interval. In one example the interval is between 7-9 hours, when the user is known to be sleeping. When the timer expires, the first communication device would wake and the processing circuitry is configured to check the status of first communication device, e.g. is the first communication device moving, or go into a predefined operation mode of being active or in a stand-by mode. In one aspect, the processing circuitry is configured to choose to set an additional timer or to activate at least the second communication device of the group of devices.

In one embodiment, the awakening is performed by a trigger, set by the processing circuitry, using a low-power radio standard such as BT low-power. The trigger may include other mechanisms including but not limited to ultrasonic or light signals.

In one embodiment, the awakening is performed by a gravitation or vibration sensor of the first communication device, such as an accelerometer, which is active in a low-power state when the operation mode of the rest of the device in the group of devices is a stand-by mode.

The exact waking and sleeping mechanism which will provide the greatest power-savings may vary based on the time of day and usage mechanism. For example, during certain times of day it may be more efficient to use BT low energy as the device is likely to be used within a short time period whereas at night it may be more efficient to set a timer.

In one embodiment the first communication device collects information of the state of the communication devices of the group of device by using input from at least one of the following the first communication device 1, 10, the at least second communication device 1, 20 and/or other information available from the network. The optimal power configuration of both the first communication device 1, 10 and the at least second communication device 1, 10, 20 is determined. This may be based on one or more of the following: the available power of all the devices, the typical power consumption of all the devices and/or the typical usage patterns of the user. The operation mode of one or more of the devices is set to low power mode based on the optimal power configuration. Before doing so, the device communicates to the other device that the device will be in a low-power state and sets a timer for wake-up or activates a wake-up mechanism if desired. In one aspect, the second communication device could remain active and wake-up the first communication device if the second communication device experiences a predetermined event. A typical example of such even would be if the user was biking or driving home and had a smart-watch wherein the battery on the phone was low but the battery on the smartwatch was relatively higher, the functionality of the mobile phone could be shut-down and the functionality of the watch could be keep active. This could be desired if the user couldn't, for example, answer the mobile phone while biking or driving. When the user reached home, the smart-watch could know this based on the proximity to the home Wi-Fi network. It could then send a signal with instructions to the phone to wake it up. The watch could further alert the user to charge the mobile phone. In one aspect, the mobile phone could set the watch into a higher power mode, enabling cellular communication, prior to setting itself into a lower power mode. The purpose is however that the one device can set the operation mode of at least two communication devices in a way that creates an optimal power consumption scenario by enabling sleep and standby modes in a manner which does not negatively impact the user experience of the devices.

Additional embodiments are of course possible. These examples are meant to be illustrative and not exclusive in nature.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

The various example embodiments described herein are described in the general context of method steps or processes, which may be implemented according to some aspects by a computer program, comprising computer readable code which, when run on an electronic device, causes the electronic device to perform the method according to above. The computer program, embodied in a computer-readable medium, includes computer-executable instructions, such as program code, executed by computers in networked environments. A computer-readable medium may include removable and non-removable storage devices 4 including, but not limited to, Read Only Memory, ROM, Random Access Memory, RAM, compact discs, CDs, digital versatile discs, DVD, etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments.

Accordingly, although specific terms are employed, they are used in a generic and descriptive sense only and not for purposes of limitation, the scope of the embodiments being defined by the following claims.

The invention claimed is:

1. A method, performed in a wearable first communication device, for setting operation modes of at least a second communication device of a group of connected communication devices in a communication network, wherein the group of communication devices comprises at least said wearable first communication device and said second communication device, wherein method comprises:
the wearable first communication device receiving environmental data, wherein the received environmental data comprises movement data representing movement of the wearable first communication device;
the wearable first communication device determining an operation mode based on said received movement data and creating instructions to set the operation mode to said determined operation mode such that:
when the received movement data indicates that a user is sleeping, the wearable first communication device creates instructions to set the operation mode to a low power mode; and
when the received movement data later indicates that the user is no longer sleeping, the wearable first communication device creates instructions to set the operation mode to an active mode;
transmitting the created instructions to the second communication device; and
setting the operation mode of said second communication device to said determined operation mode.

2. The method according to claim 1, wherein the created instructions comprises a duration in time of the determined operation mode.

3. The method according to claim 1, wherein determining the operation mode comprises determining the operation mode specified for at least one of the communication devices of the group of communication devices.

4. The method according to claim 1, wherein the determined operation mode comprises a priority for an action which can be accomplished by more than one of the communication devices of said group of communication devices.

5. The method according to claim 1, wherein the received environmental data comprises information of one or more of position, orientation, temperature, atmospheric pressure, or availability of wireless network of the at least one communication device of said group of communication devices.

6. The method according to claim 1, wherein the received information comprises an element associated with any of time of day, day of week or date.

7. A method, performed in a second communication device, for setting operation modes of at least said second communication device of a group of connected communication devices in a communication network, wherein the group of communication devices comprises a wearable first communication device and said second communication device, wherein the method comprises:
the second communication device receiving environmental data from said wearable first communication device, wherein the received environmental data comprises movement data representing movement of the wearable first communication device;
the second communication device determining an operation mode based on said received environmental data; and
setting said operation mode of said second communication device to the determined operation mode, wherein:
when the received movement data indicates that a user is sleeping, the operation mode of said second communication device is set to a low power mode; and
when the received movement data later indicates that the user is no longer sleeping, the operation mode of said second communication device is set to an active mode.

8. The method according to claim 7, wherein said received environmental data additionally comprises information of a status of said wearable first communication device.

9. The method according to claim 7, wherein said received data comprises instructions to set operation mode of said second communication device to a predetermined operation mode.

10. The method according to claim 7, wherein said received environmental data additionally includes one or more of position, state of orientation, audio data collected from the environment, temperature, atmospheric pressure, or availability of wireless networks.

11. The method according to claim 7, wherein the method comprises communicating an intended operation mode of said second communication device to said wearable first communication device prior to setting said determined operation mode.

12. A wearable first communication device configured for setting an operation mode of at least a second communication device of a group of connected communication devices in a communication network, wherein said group of communication devices comprises at least said wearable first communication device, and said second communication device, wherein the wearable first communication device comprises:
a processing circuitry configured to:
receive environmental data, wherein the received environmental data comprises movement data representing movement of the wearable first communication device;
determine an operation mode based on the received movement data and create instructions to set the operation mode to the determined operation mode such that:
when the received movement data indicates that a user is sleeping, creating instructions to set the operation mode to a low power mode; and
when the received movement data later indicates that the user is no longer sleeping, creating instructions to set the operation mode to an active mode;
transmit said instructions to said second communication device; and
set the operation mode of the second communication device to the determined operation mode.

13. The wearable first communication device according to claim 12, wherein the instructions comprises a duration in time of the determined operation mode.

14. The wearable first communication device according to claim 12, wherein the processing circuitry is configured to determine the operation mode specified for at least one of the communication devices of the group of the communication devices.

15. The wearable first communication device according to claim 12, wherein the determined operation mode comprises a priority for an action which can be accomplished by more than one of the communication devices of said group of communication devices.

16. The wearable first communication device according to claim 12, wherein the received environmental data comprises information of one or more of position, orientation, temperature, atmospheric pressure, or availability of wireless network of the at least one communication device of said group of communication devices.

17. The wearable first communication device according to claim 12, wherein the received information comprises an element associated with any of time of day, day of week or date.

18. A system for setting an operation mode of at least one communication device of a group of connected communication devices in a communication network, wherein said group of communication devices comprises a wearable first communication device and a second communication device, wherein
said wearable first communication device comprises:
a processing circuitry configured to:
receive environmental data, wherein the received environmental data comprises movement data representing movement of the wearable first communication device;
determine an operation mode based on said received movement data and create instructions to set the operation mode to said determined operation mode such that:
a when the received movement data indicates that a user is sleeping, creating instructions to set the operation mode to a low power mode; and
when the received movement data later indicates that the user is no longer sleeping, creating instructions to set the operation mode to an active mode; and
transmit the created instructions to the second communication device;
said second communication device comprises:
a processing circuitry configured to:
receive instructions from said wearable first communication device;
set an operation mode of said second communication device to said determined operation mode according to the received instructions.

* * * * *